United States Patent [19]
McArdle et al.

[11] Patent Number: 4,795,310
[45] Date of Patent: Jan. 3, 1989

[54] HELICOPTER ROTOR SYSTEM AND METHOD

[75] Inventors: Francis H. McArdle, Norristown; Earl Schneider, Havertown; Richard T. DeRosa, Brookhaven, all of Pa.

[73] Assignee: The Boeing Company, Seattle, Wash.

[21] Appl. No.: 779,353

[22] Filed: Sep. 23, 1985

Related U.S. Application Data

[62] Division of Ser. No. 429,365, Sep. 30, 1982, Pat. No. 4,543,040.

[51] Int. Cl.⁴ .................. B64C 27/48; B64C 27/40
[52] U.S. Cl. ........................... 416/134 A; 416/140
[58] Field of Search .......... 416/134 A, 140 A, 230 A, 416/141, 244 R, 244 D, 138 A

[56] References Cited

U.S. PATENT DOCUMENTS

| | | | |
|---|---|---|---|
| 4,195,967 | 4/1980 | Weiland | 416/134 A |
| 4,242,048 | 12/1980 | McArdle | 416/134 A |
| 4,249,862 | 2/1981 | Waddington et al. | 416/140 A |
| 4,257,739 | 3/1981 | Covington et al. | 416/134 A |
| 4,273,511 | 6/1981 | Mouille et al. | 416/140 A |
| 4,297,078 | 10/1981 | Martin | 416/140 A |
| 4,304,525 | 12/1981 | Mouille | 416/134 A |
| 4,321,013 | 3/1982 | Schwarz et al. | 416/244 R |
| 4,342,540 | 8/1982 | Lovera et al. | 416/140 A |
| 4,361,415 | 11/1982 | Aubry | 416/140 A |
| 4,369,019 | 1/1983 | Lovera et al. | 416/134 A |
| 4,381,902 | 5/1983 | Head et al. | 416/141 |
| 4,407,633 | 10/1983 | Mouille | 416/140 A |
| 4,419,051 | 12/1983 | DeRosa | 416/140 A |
| 4,466,774 | 8/1984 | Cycon et al. | 416/134 A |
| 4,504,193 | 3/1985 | Mouille | 416/140 A |
| 4,512,717 | 4/1985 | Pancotti et al. | 416/141 X |
| 4,542,567 | 9/1985 | McArdle et al. | 29/156.8 R |
| 4,543,040 | 9/1985 | McArdle et al. | 416/134 A |
| 4,556,365 | 12/1985 | Mouille et al. | 416/134 A |
| 4,568,245 | 2/1986 | Hibyan et al. | 416/141 X |

*Primary Examiner*—Everette A. Powell, Jr.
*Attorney, Agent, or Firm*—Jones, Tullar & Cooper

[57] ABSTRACT

A rotor hub system for a helicopter in which the rotor hub and pitch housing are fabricated predominately of composite material, the flap hinge, pitch hinge and lead-lag hinge contain elastomeric bearings and one step blade folding in either the forward or aft direction using the same drive system. The rotor hub includes closed loop straps which define generally opposed lugs of the flap hinge, and the pitch housing includes a pair of closed loop straps which define the lugs of the lead-lag hinge and a lug of the flap hinge. The use of composite materials as the predominant material of the rotor hub and the pitch housing results in a highly load redundant structure permitting a reduction in size and number of parts, a reduction in drag, and an increase in reliability and safety.

6 Claims, 10 Drawing Sheets

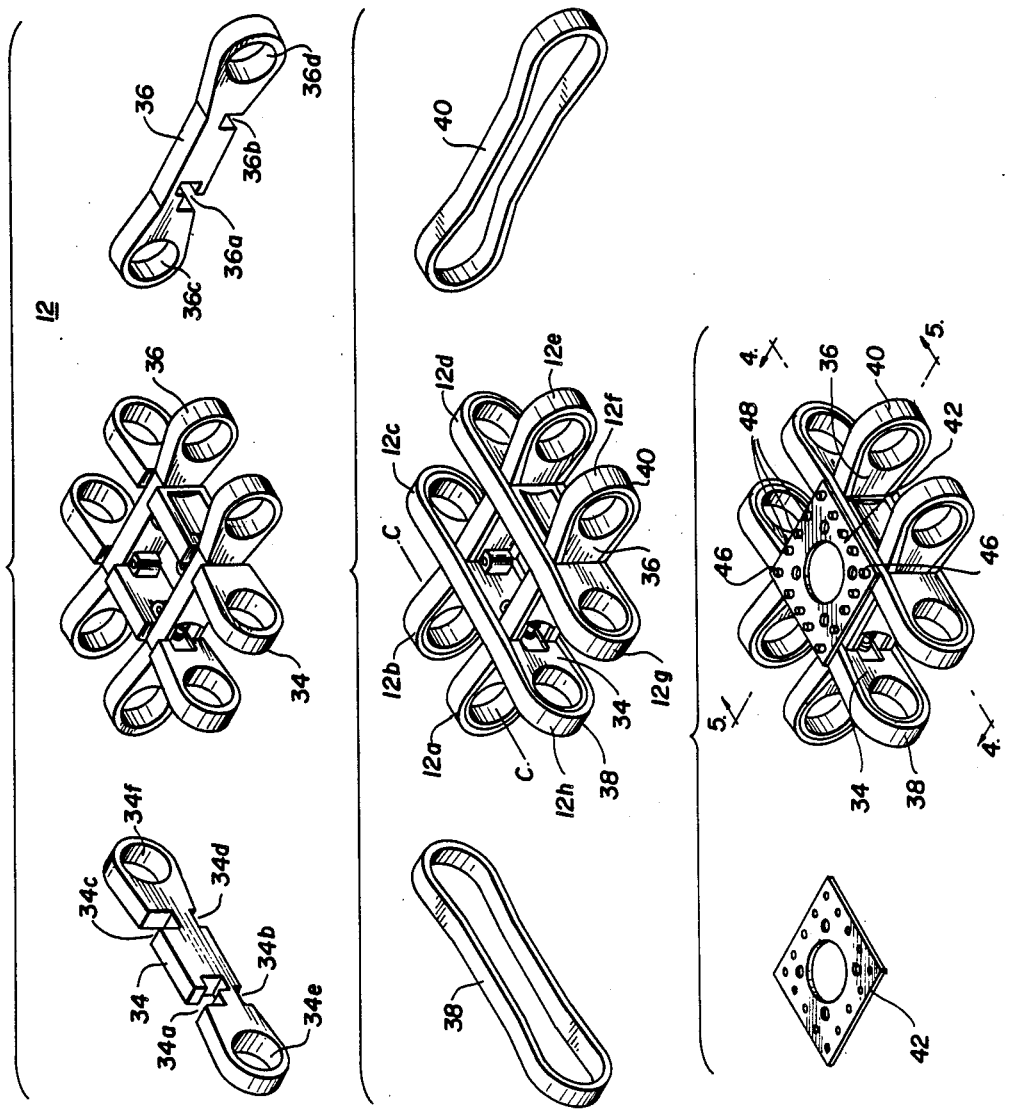

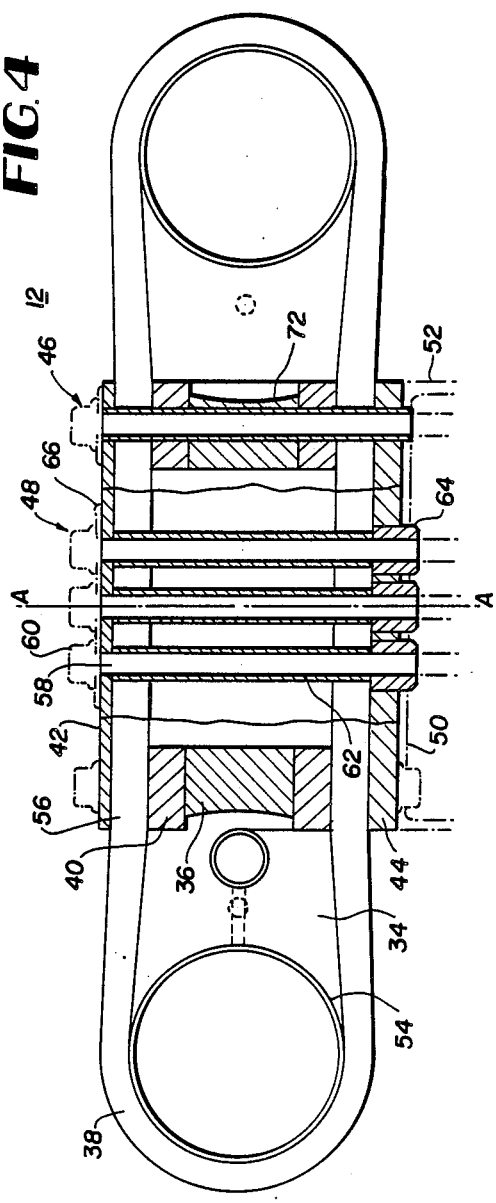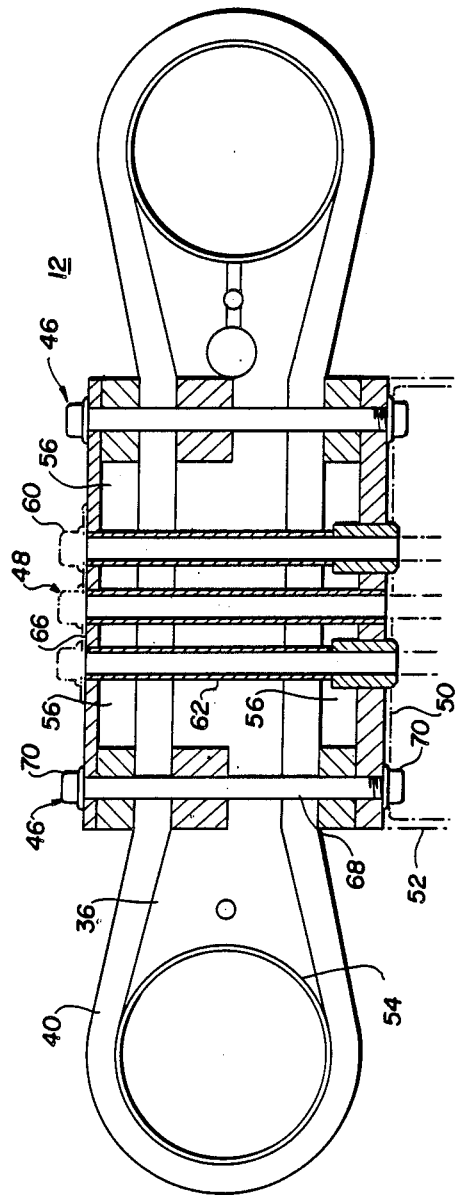

HELICOPTER ROTOR SYSTEM AND METHOD

This is a divisional of application Ser. No. 429,365 filed Sept. 30, 1982 and now U.S. Pat. No. 4,543,040.

BACKGROUND OF THE INVENTION

1. Field of the Invention

The present invention relates to the rotor system of a helicopter excluding the upper controls, and to a method of fabricating component parts of the rotor system from composite material.

The rotor system presented is a fully articulated rotor system, although the invention has application in other rotor system configurations.

2. Prior Art

The traditional articulated rotor system configuration for operational helicopters with three or more rotor blades has been:

(1) a machined metal hub block assembly which provides transmission of drive torque from the transmission assembly output to the rotor hinge assembly and rotor blades via attachment lugs;

(2) a mechanical hinge assembly of machined metal components, pins, and bearings which secure the blades to the rotor hub while permitting flap motion, lead-lag motion and feathering motion;

(3) a flexible mechanical assembly of metal straps or wire strands which transfer centrifugal force load from the blade root end to the hub block with minimum feathering resistance; and (4) a lead-lag damper.

A current metal hub rotor system manufactured by the assignee of the present invention for the CH-47 helicopter is a typical example of the traditional articulated rotor systems noted above. Historically, few problems have been encountered in achieving satisfactory static strength in such a rotor system. The problems that were encountered centered mainly about component endurance in terms of fatigue life and wear. The fatigue life has been improved somewhat by improved design materials and processes. The wear problem is manifested mainly in bearing rolling elements, races, and seals. Bearing design has improved through practical experience and analytical and test developments. Seal integrity has been improved, and grease lubrication has been replaced by oil lubrication. Further, metal alloying, heat treatment, machined surface finish and surface hardening and cold working methods have also been improved.

There is a limit, however, to the traditional rotor system technology improvement cycle using known materials and techniques. This limit is of particular concern when it is noted that the growing necessity to increase aircraft speed and to reduce fuel consumption requires reduction in hub drag which limits bearing and hub component size, but does result in a weight reduction. The weight reduction means less load-carrying material, hence higher stresses.

Rotor system design technology, in this dilemma, turned to utilization of ne metal alloys, reduction or elimination of bearings and introduction of new design concepts. Titanium alloys have been used to replace steel in more recent designs, benefitting somewhat from improved specific fatigue strengths. Specific ultimate strength and specific stiffness, however, are similar among the leading metal candidates, i.e., aluminum, titanium and steel. When cracks are initiated in the notch sensitive titanium alloys, crack propagation rates are of vital concern.

The designers next turned to non-metallic materials such as elastomeric materials for bearings and fiber reinforced materials (composites) for structural members, The advent of these non-metallic materials has opened a new avenue of innovation and improvement in aircraft design.

The application of composite materials to rotor systems indicates, for example, that they have potential in providing a solution to many of the ailments of metallic rotor hubs. Composite materials have been shown to improve life, damage tolerance and fail safety due to their relative notch insensitivity, slow crack growth, superior fatigue strain endurance and high strain energy storage prior to fiber failure. The raw material is basic in that it can be sized and shaped to any proportions with a minimum of trim and scrappage, allowing strength and stiffness to be discretely introduced only where required. Techniques have been developed to reduce damage propagation even further through material hybridization and fiber and layer orientation. Composites are not susceptible to corrosion and are readily inspectable using ultrasonic and/or radiographic techniques to detect flaws in their laminar and fiber content. Their high specific strength and stiffness offer the potential of significant weight reductions.

The application of composite material to a main rotor hub and hinge assembly of a helicopter has been suggested. See, for example, U.S. Pat. Nos. 3,762,834 and 4,012,169. These so-called "star-like" structures are essentially formed as continuous plates with three extending arms. In U.S. Pat. No. 4,012,169, each arm comprises three parallel plates for providing a truss configuration. These, however, have been applied to single main rotor helicopters and not to tandem helicopters. The two systems (single rotor and tandem) do have differences. For example, a tandem system may require a higher lag hinge offset than that resulting in single rotor systems because lag deflection of the blade tip, for the condition of CF and drag movement equilibrium about the lag hinge, is inversely dependent on the radial placement of the lag hinge. It can be concluded, therefore, that if the design criteria peculiar to a tandem system are met, then the resultant configuration can be applied directly to a single rotor helicopter. However, if only those goals peculiar to a single rotor system are achieved, then the resultant hub, for example, would be unsuitable for application to a tandem system.

OBJECTS AND SUMMARY OF THE INVENTION

An object of the present invention is to provide a rotor system for a helicopter in which the number of single load path components are minimized. It is clear that a single load path component is dangerous, for in failure, it could result in loss of the aircraft.

A related object of the present invention is to provide a rotor system having improved load redundancy and therefore reliability.

Another object of the present invention is to provide a rotor system with improved blade folding capability.

Another object of the present invention is to provide a rotor system which utilizes composite material in all its major parts: hub; pitch housing; bearings; and blades. It is believed that significant improvements in rotor systems can be realized through the use of composites.

A related object of the present invention is to provide a rotor system having a reduced parts count due to the use of composites, resulting in a weight advantage. With composites and elastomers, drag can be reduced and roller bearings and their associated seals and lubrication systems can be eliminated. Aircraft maintainability is therefore improved.

Another object of the present invention is to provide a clean, low drag composite rotor system capable of blade folding.

These objects are realized by a rotor system for a helicopter employing only elastomeric bearings for the flap, lead-lag and pitch bearings, a hub and pitch housing both constructed as composite structures, and blade folding which achieves one step folding in either the forward or aft direction using the same drive system.

The use of composites results in weight and drag reduction without sacrificing static strength. For example, specific static strengths of unidirectional composite materials are at least 2.4 times that of titanium, which has the highest specific strength of the metals used in aircraft today. This suggests that, for axially loaded elements, composites will result in weight and size reductions. Under flexural and/or torsional loading, however, the gain is somewhat reduced due to the necessity to enhance shear strength because of the inferior shear capabilities of the matrix of the composite materials. This deficiency can be overcome, however, and the desired shear stiffness attained in a composite structure through the addition of biased reinforcing.

To meet the desired strength requirements and achieve an overall weight and drag reduction, the replacement of metal by composite material in the rotor system is accomplished through discrete choice of material and orientation of fibers. Thus, the hub, for example, is provided with at least two continuous composite bands (for the case of a two bladed rotor system) which can be filament wound, forming opposed flap hinge lugs which transfer the centrifugal forces and shears due to blade moments to the opposed lugs for reaction. The result is that forces are reacted through to the opposite blade.

Both the rotor hub and pitch housing preferably each have two loops, designed so that one loop is capable of carrying the full load should the other loop be damaged or destroyed.

The rotor system also preferably will have a coincident lead-lag/fold hinge with an electromechanical motor and gear box located near the horizontal hinge together with links that offer a mechanical advantage for blade folding in one step in either the forward or aft direction using the same drive system. It will also use elastomeric bearings extensively at the flap, lead-lag and pitch hinges and include a one-piece droop stop/up stop which controls the blade both while rotating and nonrotating. The droop stop can be a one piece cam that is mounted in the hub and is designed to interface with a mating cam that has been integrated with the pitch shaft.

BRIEF DESCRIPTION OF THE DRAWINGS

FIGS. 3a–3c are each schematic perspective views which illustrate the relationship of several of the major components of the rotor hub for the four bladed rotor system.

FIG. 4 is a more detailed view of one variant of the rotor hub when viewing the rotor hub along line 4—4 of FIG. 3c.

FIG. 5 is a more detailed view of the same variant of the rotor hub when viewing the rotor hub along lines 5—5 of FIG. 3c.

DESCRIPTION OF THE PREFERRED EMBODIMENT

The embodiments and variants thereof which have been selected for more detailed discussion herein were developed for use as main rotor systems for a tandem rotor system helicopter. Nevertheless, their use as the main or tail rotor system for a single rotor system helicopter is contemplated. Simplified schematic illustrations are relied upon extensively where appropriate for ease of understanding. Those skilled in the art will readily appreciate that conventional structures and functions need not be described or illustrated in any greater detail. The areas of concern are the rotor hub, the pitch housing, the elastomeric bearings at the various hinges and the blade folding mechanism.

Figure 13:
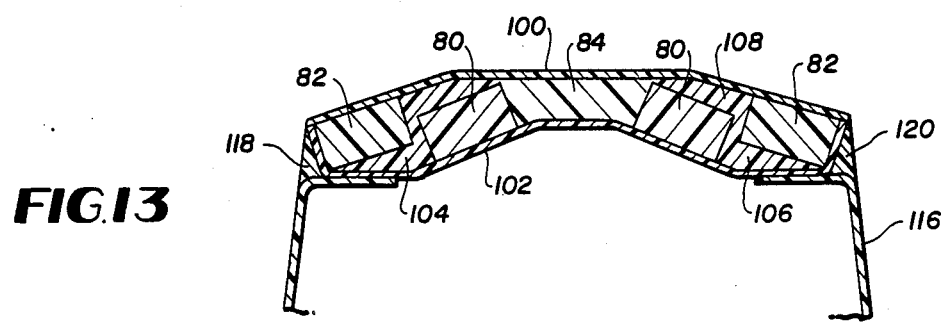
FIG. 13 is a view of the pitch housing taken along line 13—13 of FIG. 9.
Figure 14:
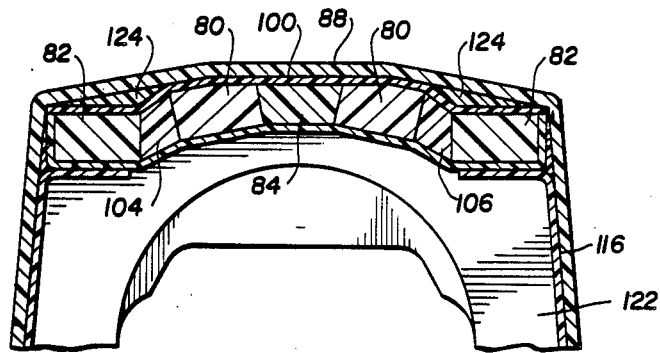
FIG. 14 is a view of the pitch housing taken along line 14—14 of FIG. 9.

Two embodiments are preferred, each of which has one of two preferred variants of a rotor hub. The two embodiments comprise the four bladed rotor system shown in FIGS. 1–12, and the three bladed rotor system shown in FIG. 13. Each embodiment includes the same pitch housing assembly and blade folding mechanism.

Four Bladed Rotor System

Figure 1:
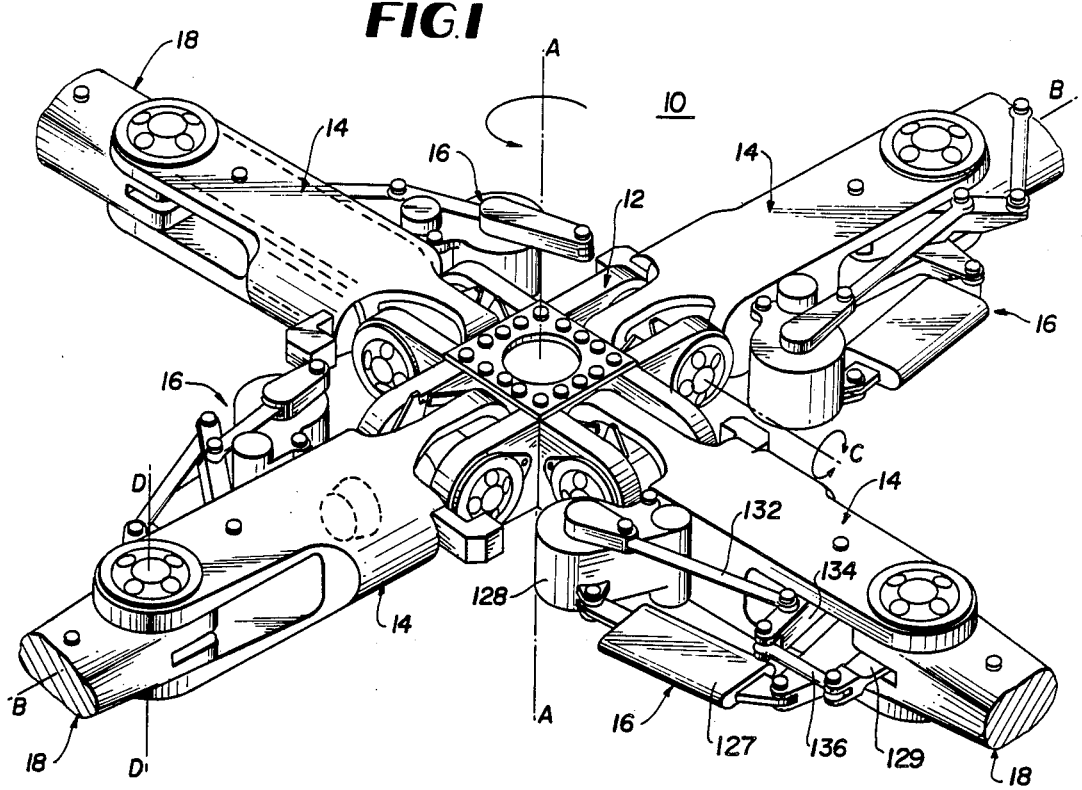
FIG. 1 is a schematic perspective view of a four bladed rotor system embodying the present invention.

The four bladed rotor system 10 generally includes a rotor hub 12, four pitch housings 14, four lag damper and blade folding mechanisms 16 and four blades 18. The components assembled as shown in FIG. 1 comprise a fully-articulated rotor system, i.e., a system which rotates about axis A—A and in which the rotor blades are permitted pitching, flapping and lead-lag movement about a respective pitch axis B—B, flap axis C—C and lead-lag axis D—D.

To permit the pitch, flap and lead-lag movement, elastomeric pitch, flap and lead-lag bearings are preferred. These are more clearly shown in FIG. 2. The lead-lag bearings and the flap bearings form part of lead-lag hinges 20 and flap hinges 22. The lead-lag hinges 20 also include pins 24 (commonly referred to as the vertical pins), and the flap hinges 22 also include pins 26 (commonly referred to as the horizontal pins). The pitch bearings 28, flap bearings 30 and the lead-lag bearings 32 are configured to accommodate both radial and axial loads while permitting angular oscillation. This is accomplished by alternate laminae of elastomeric material, through which shear deflection permits angular oscillatory motions and laminae of metal which restrict a lateral distortion or flow of the elastomer material when under compressive loading. Bearings of this type in a rotor system are known.

Figure 6:
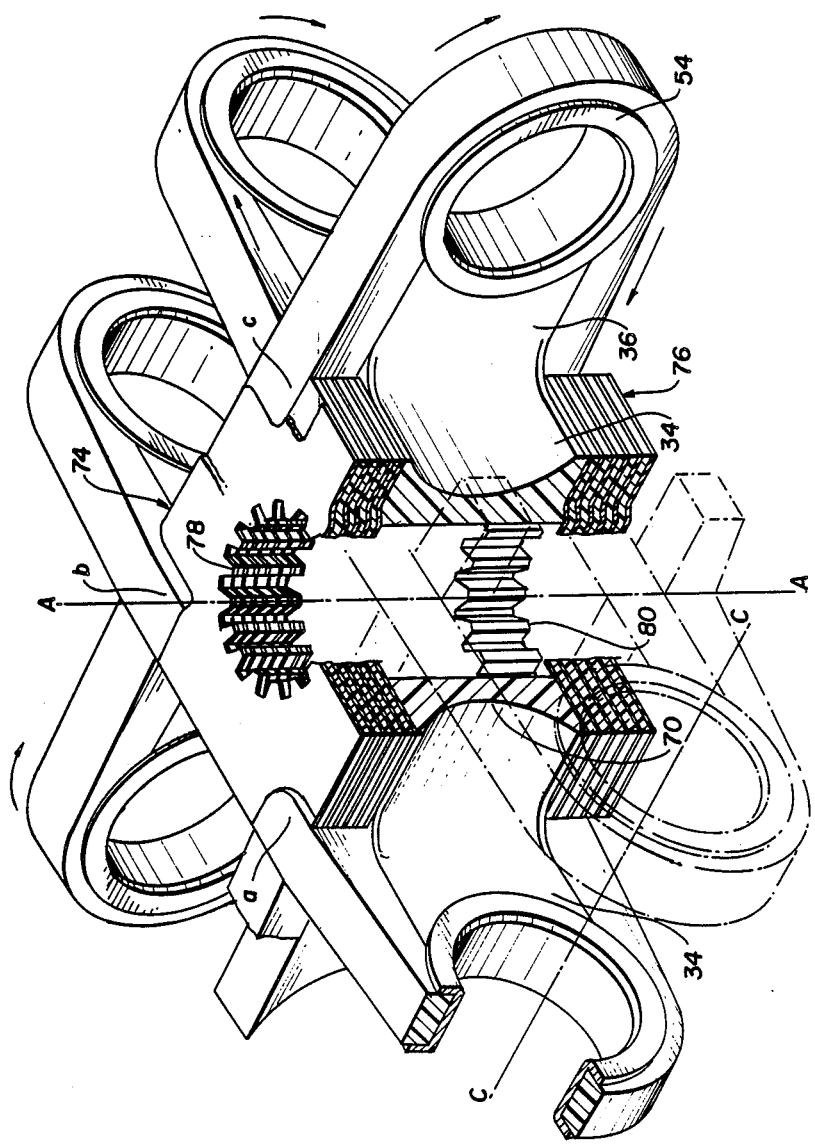
FIG. 6 is a schematic perspective view of another variant of the rotor hub.
Figure 7:
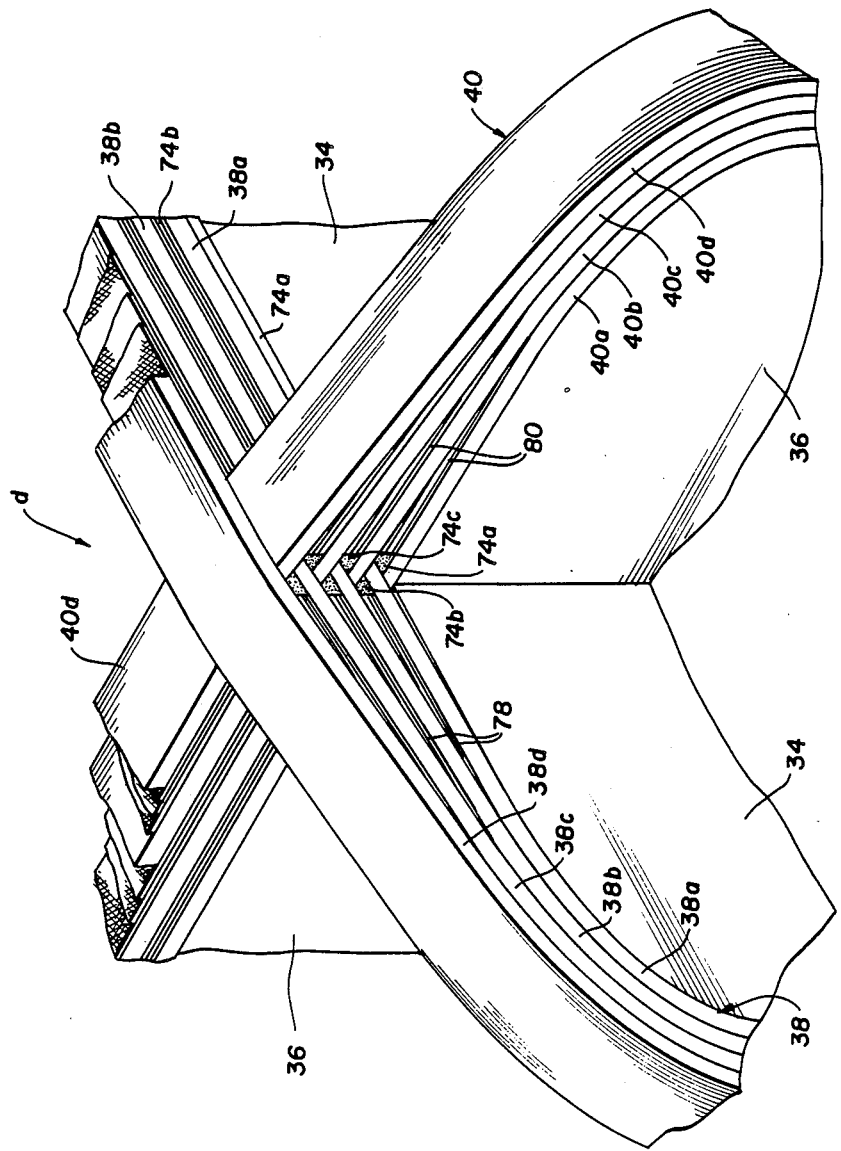
FIG. 7 is a schematic perspective view of one of the intersections of the rotor hub shown in FIG. 6.

The rotor hub 12 is fabricated of predominantly composite material according to one of two variants. One variant is shown in FIGS. 3–5 and the other is shown in FIGS. 6 and 7. The primary difference between the two variants lies in the fabrication of the intersections.

FIG. 3 illustrates, in a simplified fashion, the major components of the rotor hub 12. These include upper cores 34, lower cores 36, outer straps 38, inner straps 40, upper plate 42 (a lower plate 44 is shown in FIGS. 4 and 5) and bolt assemblies 46 and 48. The terms upper, lower, outer and inner with respect to the cores and straps are used to distinguish the components and not to necessarily convey a directional relationship. The cores and straps are fabricated of composite material, while the upper and lower plates may be fabricated of composite material or of metal.

A more detailed view of the rotor hub 12 with the various components assembled is shown in FIGS. 4 and 5. These figures show the rotor hub 12 supported on a flange 50 of a drive shaft 52, a bushing 54 which can be press fitted into an appropriately dimensioned bore in each lug end of a core and strap assembly and filler blocks 56.

The rotor hub assembly 12 is bolted to the drive shaft by the four bolt groups including the bolt assembly 48. Each bolt assembly 48 includes a bolt 58, a nut 60, a bushing 62 and a barrel nut (not shown). The two outside bolt assemblies 48 of each bolt group further include a bushing 64 and a single bearing plate or individual bearing plates 66. The bolts 58 extend into the rotor shaft 52 to a point of intersection with radial bores (not shown). The barrel nuts are located at this intersection and are accessible through the radial bores in the rotor shaft. The bushings 64 are press fitted into the flange 50 of the rotor shaft 52 and extend into a lower plate 44 (FIG. 4) or into the lower plate 44 and filler block 56 (FIG. 5).

The bolt group formed by the bolt assemblies 46 are located outside of the rotor shaft radius. Each of the bolt assemblies 46 includes a bolt 68 threadedly connected at each end to a nut 70.

The bolt group formed by the bolt assemblies 48 transmit rotor shaft torque to the rotor assembly 10 and certain aerodynamic loads from the rotor blades 18 to the rotor shaft.

The first step in fabricating the rotor hub 12 is the production of the upper and lower cores 34 and 36. Each of these cores is made of composite material. The cores can be made on an automatic tape lay-up machine or they can be filament wound, to mention only two possible manufacturing techniques. The cores are then cured in an autoclave for a given period and at a given pressure and temperature. As a result of the curing process, the cores are structuralized. Subsequent to curing, the individual cores are machined to produce the notches 34a–34d; 36a–36b, and bores 34e–34f; 36c–36d. The cores are then bonded to assembly as shown in FIG. 3a.

The straps 38 and 40 are then made, for example, by filament winding or tapewinding directly onto the cores. The inner straps 40 cross below outer straps 38 as shown in FIG. 3b. Filler blocks 56, which have previously been fabricated by curing, are inserted on inner straps 40, and outer straps 38, and held in assembly by, for example, an adhesive. If the upper and lower plates 42 and 44 are made of composite material, they too are previously fabricated by curing, and thereafter placed in assembly and retained thereby, for example, an adhesive, as shown in FIG. 3c. The entire assembly shown in FIG. 3c is then placed in an autoclave and cured to form a structuralized component defining lugs 12a–12h. The lug pairs 12a–12b; 12c–12d; 12e–12f and 12g–12h form clevises which partly define the flap hinges 22.

Subsequent to curing, the rotor hub 12 has the outer facing surfaces of each core machined to include the radius 72 (FIG. 4). This radius is included to accommodate the pitch housing and blade flapping. Alternatively, the radius 72 can be generated during pre-curing fabrication.

The other variant of the rotor hub 12 is shown in FIGS. 6 and 7. The cores 34 and 36 are similar to those of the variant shown in FIGS. 3–5, except that the outer surfaces of the cores are flush in assembly, so that the recesses shown in FIG. 3a are not produced. The straps 38 and 40 are fabricated in the same fashion except that they are interwoven at intersections a–h with each other and with the edges of the plates forming an upper block 74 and a lower block 76. The blocks 74 and 76 comprise a laminated assembly of, preferably, steel plates and composite filler plates. The blocks 74 and 76 define splines 78 and 80, respectively. The splines 78 and 80 engage corresponding splines on the rotor drive shaft (not shown) for transmitting drive shaft torque to the rotor system 10. The rotor hub 12, and along with it the entire rotor system 10 is mounted to the rotor shaft and retained to the rotor shaft by a nut and washer (not shown) at the top of the rotor shaft.

The noted interweaving is shown in more detail in FIG. 7, which, schematically, depicts intersection d with the plates of the upper block 74 shown only at the intersection for clarity. The straps 38 and 40 comprise layers 38a–38d and 40a–40d with composite filler segments 78 and 80 between the layers in the vicinity of the block 74. The block 74 includes corresponding layers 74a, 74b, etc., each of which may comprise as previously noted, a steel plate and a composite filler plate.

The cores 34 and 36 are fabricated similarly to those of the variant disclosed by FIGS. 3-5. In constructing the intersections a-h, an alternating procedure is employed, i.e., for example illustrated in FIG. 7, the layer 40a may be applied first, followed by the layer 74a a filler segment 78, the layer 38a and a filler segment 80. This procedure is repeated until the desired number of layers have been woven. The assembly is then subjected to a final cure cycle and the hub structuralized.

The pitch housing 14 is preferably the same for either variant of the rotor hub. It generally includes apart from the elastomeric bearings and associated bushings, as shown in FIGS. 8-16 a D-section 78, an inboard strap 80, an outboard strap 82, a center stiffener 84 (top and bottom), an outboard transverse strap 86 and an inboard transverse strap 88. In addition, the pitch housing 14 includes, as shown in FIGS. 2 and 20-22, a pitch arm 90, a pitch shaft 92 and a flap motion stop contactor 94.

Figure 8:
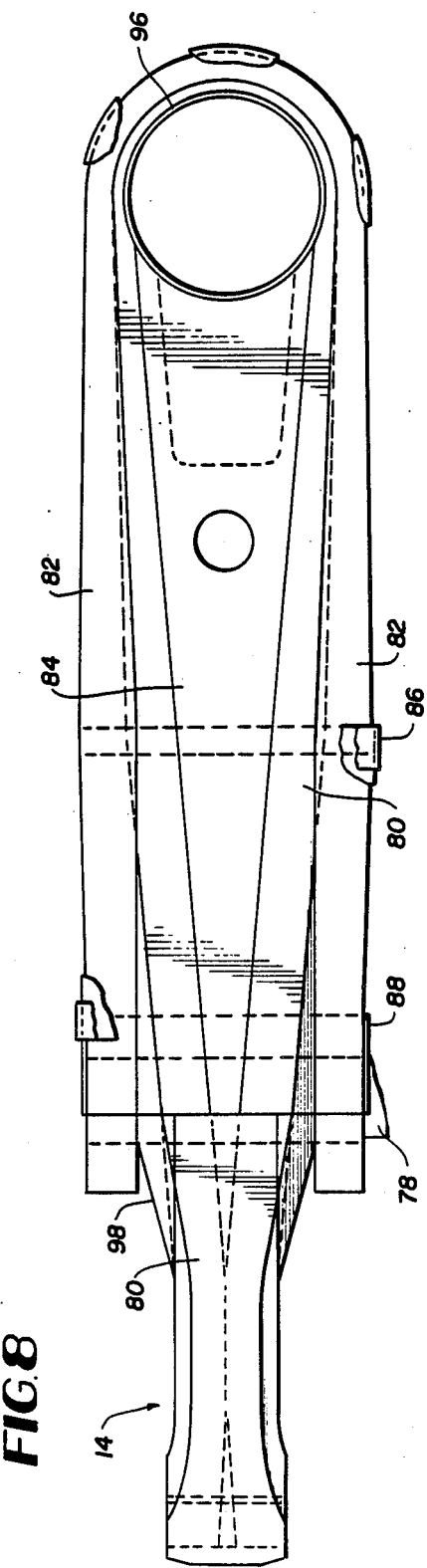
FIG. 8 is a top view of a pitch housing constructed according to the present invention.
Figure 17:
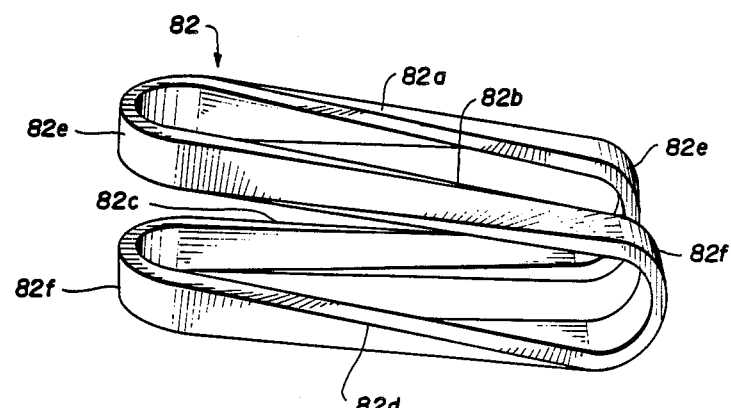
FIG. 17 shows the outboard closed loop strap of the pitch housing removed from the pitch housing.

The straps 80 and 82 are both constructed as closed loop straps such that if one strap loop fails, the other strap loop is capable of carrying the full load. Both straps are rotated 90 degrees from its inboard end to its outboard end. FIG. 17 shows the final configuration of the outboard strap 82 removed from the pitch housing. Note that the strap is formed as a closed loop and is rotated 90 degrees, i.e., the arms 82a-82d are twisted so that surfaces 82e and 82f proceed from a vertical to a horizontal orientation. The horizontally oriented end surfaces 82f are wrapped around the D-section 78 (FIG. 9) and the vertically oriented end surfaces 82e are wrapped around the bushing 96 of the lead-lag hinge 20 (FIG. 8).

The final configuration of the inboard strap 80 is somewhat different from that of the outboard strap 82. The progression of the inboard strap 80 can be seen from FIG. 8. The outer surface 80 is oriented horizontally at the inboard end and vertically at the outboard end where it is also wrapped around the bushing 96. At the inboard end it is wrapped around an inboard chord ply extension 98 of the D-section 78.

Figure 2:
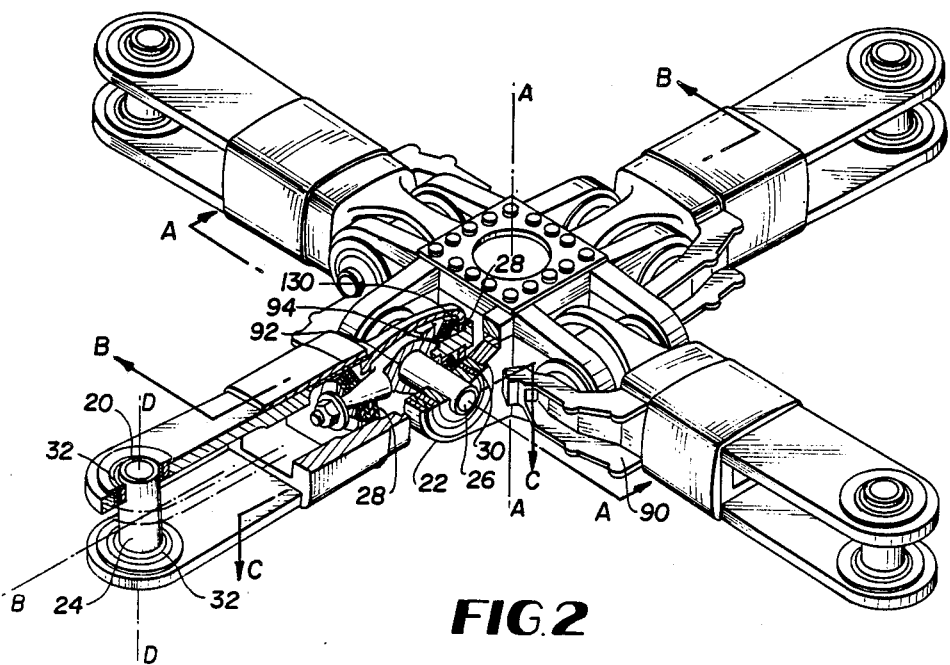
FIG. 2 is a schematic partial perspective view which illustrates the elastomeric bearings located at the flap, pitch and lead-lag bearings of the rotor system.
Figure 9:
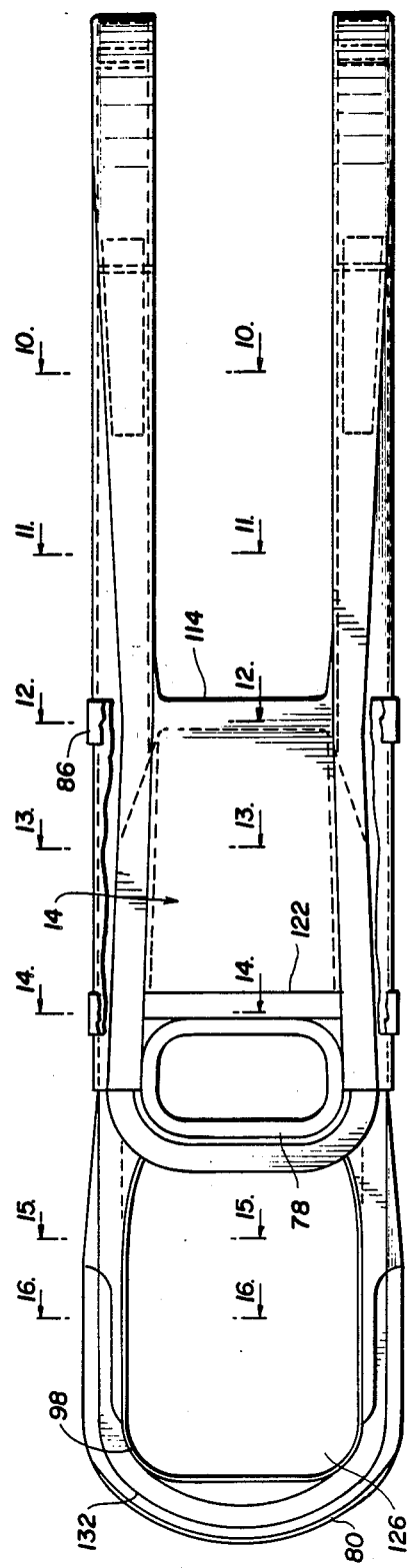
FIG. 9 is an elevational view of the pitch housing shown in FIG. 8.
Figure 10:
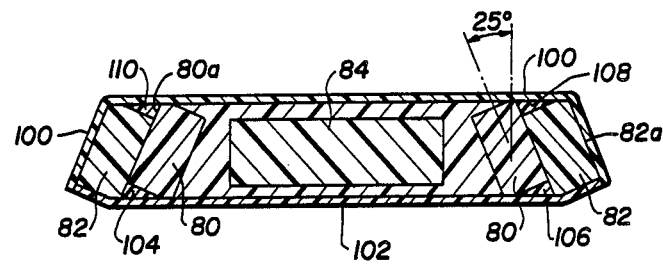
FIG. 10 is a view of the pitch housing taken along line 10—10 of FIG. 9.
Figure 11:
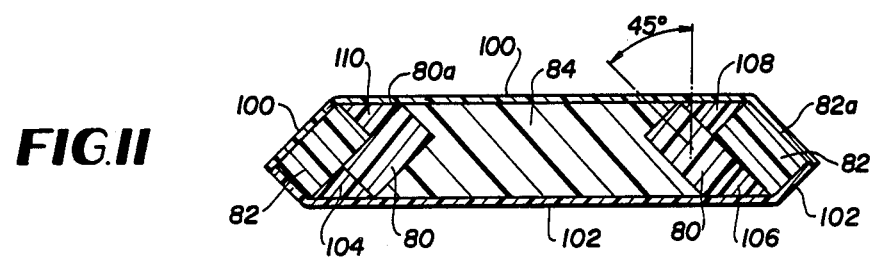
FIG. 11 is a view of the pitch housing taken along line 11—11 of FIG. 9.
Figure 12:
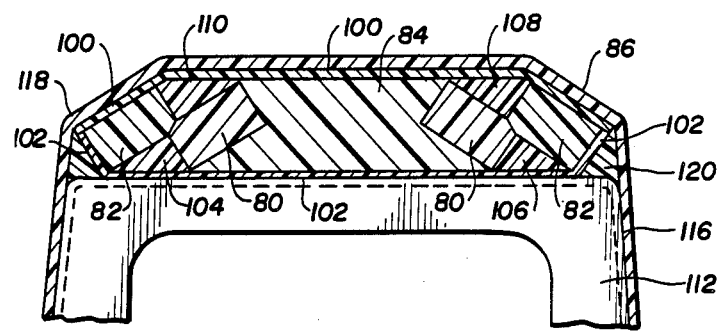
FIG. 12 is a view of the pitch housing taken along line 12—12 of FIG. 9.
Figure 15:
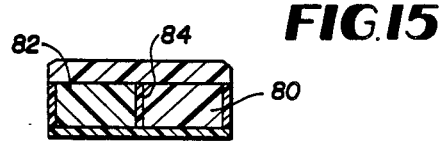
FIG. 15 is a view of the pitch housing taken along line 15—15 of FIG. 9.
Figure 16:
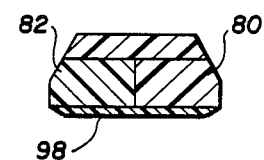
FIG. 16 is a view of the pitch housing taken along line 16—16 of FIG. 9.

The relative orientation of the straps 80 and 82 as they progress from their outboard to their inboard ends can be better understood by reference to FIGS. 10-16. In FIG. 10 the straps 80 and 82 have both reached a tilt of approximately 25 degrees. The center stiffener 84 is situated between the two arms of the inboard strap 80. Surrounding the straps and stiffener are an upper skin 100 and lower skin 102. The noted tilt and the upper and lower skins create spaces which are filled by filler packs 104-110. By FIG. 11, the tilt has reacted approximately 45 degrees. The tilt increases until the surfaces 80a and 82a are horizontal relative to the co-ordinate system applied in FIGS. 10 and 11. At the station depicted in FIG. 12, the D-section 78 defines a bulkhead 112, which together with the facing bulkhead 114 (FIG. 9) impart support to the straps 80 and 82 at the region of least mutual contact. From that station inboard, the D-section 78 provides support to the straps 80 and 82. At the station represented in FIG. 12, there is located the outboard transverse strap 86. Between the straps 86 and 88 there is added a band-wrap around 116. The band-wrap around 116 creates further spaces which are filled by filler packs 118 and 120. At the station represented in FIG. 14, the D-section 78 defines a bulkhead 122 which serves as a support for one end of the pitch shaft 92 and a seat for inboard pitch bearing 28 (FIG. 2). At the station represented in FIG. 14, there is located the inboard transverse strap 88, which together with the upper skin 100 define a space filled by filler pack 124. FIG. 15 shows the straps 80 and 82 in horizontal orientation with a segment of center stiffener 84 remaining. At the station represented by FIG. 16, the straps 80 and 82 are in horizontal abutment.

Figure 21:
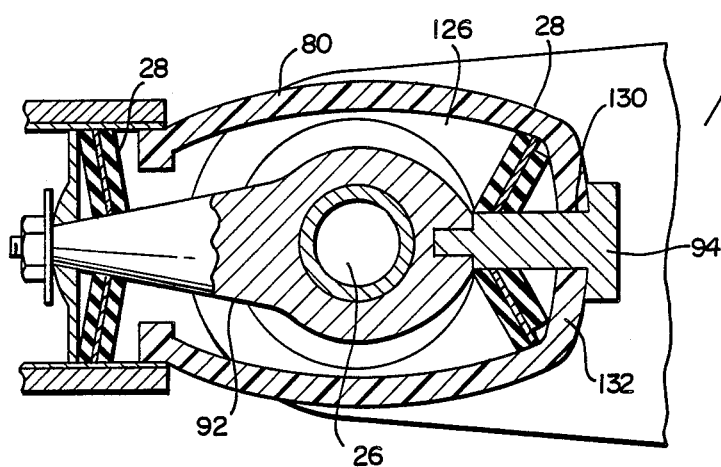
FIG. 21 is a view of the inboard end of the pitch housing and flange hinge, taken along line B—B of FIG. 2.
Figure 22:
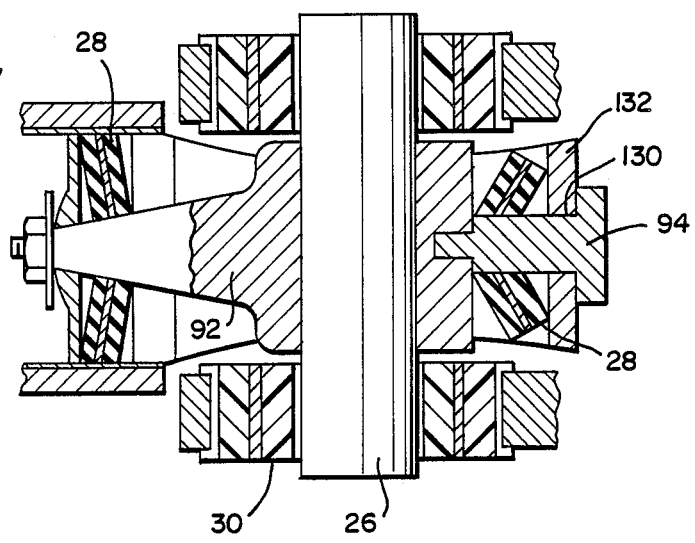
FIG. 22 is a view of the inboard end of the pitch housing and flap hinge, taken along line C—C of FIG. 2.

The pitch shaft 92 extends inboard from the bulkhead 122 into the space 126 (FIG. 9). A bore 130 (FIGS. 2, 21 and 22) is drilled into the inboard wall 132 (FIGS. 9, 21 and 22) of the strap 80. The bore 130 accommodates one end of the flap motion stop contactor 94. The other end of the stop 94 is preferably threadedly engaged with the pitch shaft 92 (FIGS. 2, 21 and 22).

Three Bladed Rotor System

Figure 18:
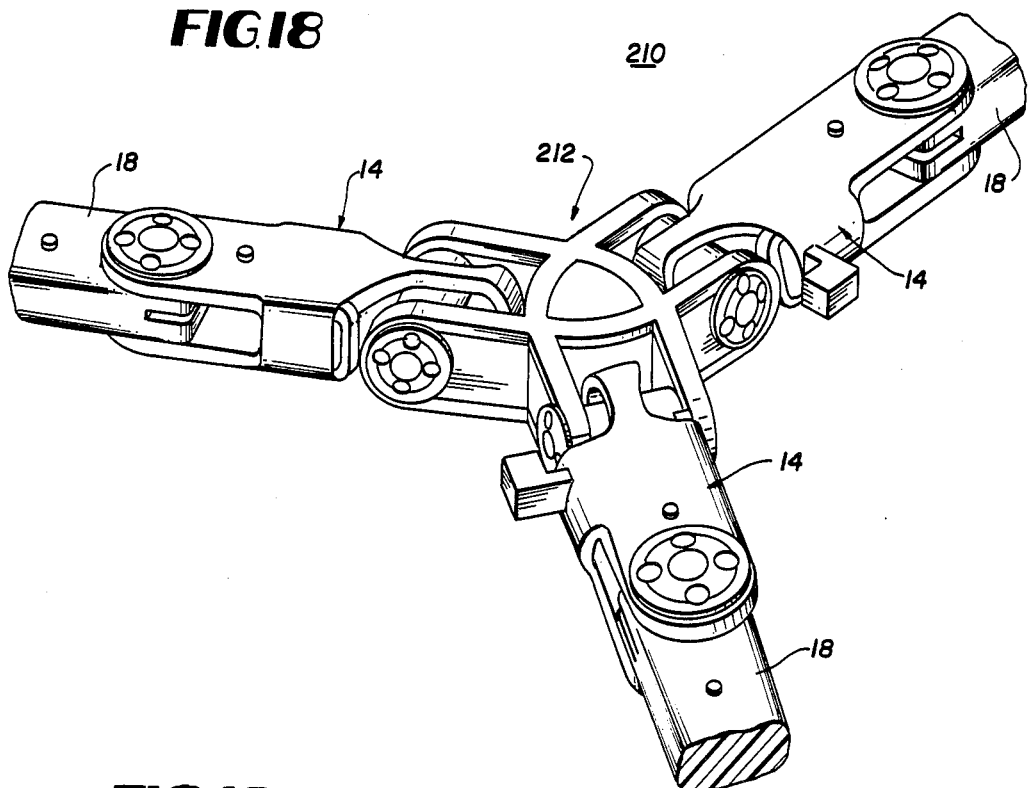
FIG. 18 is a schematic perspective view of a three bladed rotor system embodying the present invention.
Figure 19:
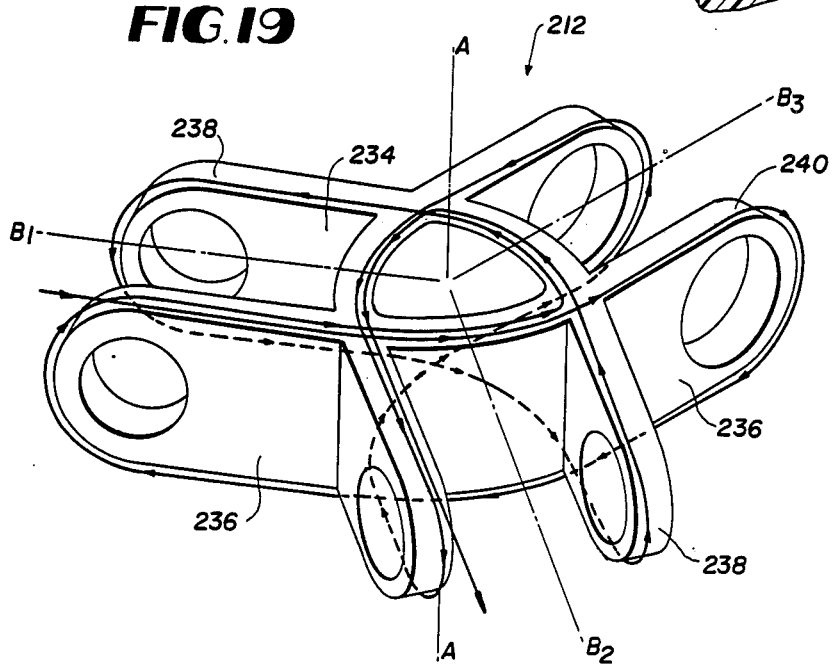
FIG. 19 is a schematic perspective view of the rotor hub for the three bladed rotor system.
Figure 20:
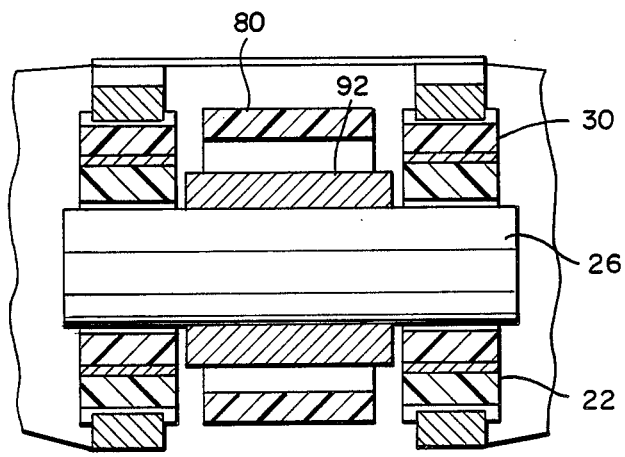
FIG. 20 is a view of the inboard end of the pitch housing and flap hinge, taken along line A—A of FIG. 2.

The three bladed rotor system 210 generally includes a rotor hub 212, three pitch housings 14, three lag dampers and blade folding mechanisms (not shown, although similar to those shown in FIG. 1) and three blades 18. As in the system shown in FIG. 1, the system shown in FIG. 18 is a fully-articulated rotor system.

The rotor hub 212 is fabricated as is the rotor hub 12 of predominantly composite material, and as is the rotor hub 12, in accordance with either f the two variants noted for the rotor hub 12. The cores 234 and 236 must only be curved such that the axes B1, B2 and B3, which are coaxial with the pitch axis are mutually displaced about the axis of rotation A—A by 120 degrees rather than 90 degrees (FIG. 1). Once the cores 234 and 236 are assembled, the straps 238 and 240 can be fabricated as were the straps 38 and 40. They simply follow the curvature of their respective cores. The attachment to the rotor shaft can also follow either of the two variants noted above, and in the case of the interwoven variant the upper and lower blocks would have plates which have the outline defined by the assembled cross 234 and 238.

From a load reacting point of view, the rotor hub of both the four bladed rotor system and the three bladed rotor system is unique in the manner in which loads input with the rotor hub at the lugs defining the flap hinge are reacted. In the four bladed rotor system, each strap transfers the load at one lug to the opposite lug for reaction by the opposing blade. Blade CF loads are therefore reacted entirely by the straps, while lift is transmitted by the bolt group (first variant) or the nut and washer (second variant), and torque is transmitted by the bolt group (first valiant) or the splines (second variant). In the three bladed rotor system the straps also react blade CF loads. However, the loading is not confined to the same strap. Instead, it is transferred in addition to the remaining straps as well. Lift and torque are transmitted as in the four bladed rotor system.

Blade Folding

Referring to FIG. 1, the lag damper and blade folding mechanism 16 includes an elastomeric lag damper 127, a fold motor and gear box 128 and associated linkages including a bellcrank 129 fastened at the lead lag hinge to the rotor blade 18. The fold motor and gear box 128 has a rod 132 extending therefrom which engages a bellcrank 134 which in turn is connected to the bellcrank 129 by a connecting rod 136. To fold the blade 18 counterclockwise (FIG. 1) the rod 132 is extended, while for a clockwise direction the rod 132 is retracted. The blade folding mechanism 16 achieves blade folding in either direction using the same drive system, i.e., the same fold motor and gear box 128, bellcrank 129, rod 132, bellcrank 134 and rod 136. Of these the bellcrank 129 is fastened as noted above, while the remaining elements are mounted to the pitch housing 14.

Materials And Cure Cycle

When a component is identified as a composite it should be understood that it comprises composite material. As already noted, composite material is used extensively in the rotor system described. In addition, the rotor blades of the system are preferably composite rotor blades, the composite blades disclosed in U.S. Pat. Nos. 4,095,322 and 4,316,701 being preferred.

In the rotor hub 12 the cores 34 and 36 are preferably fabricated of epoxy impregnated prepreg 'E' glass per BMS 8-79 class III, GR 1, type 1581, Form (1). The closed loop straps 38 and 40 are preferably fabricated of unidirectional 'S' glass epoxy prepreg per BMS 8-164, class 'A', type I-1; epoxy impregnated prepreg 'E' glass per BMS 8-79 class III, GR 1, type 1581, Form (1); 45° bias plied epoxy prepreg per BMS 8-164 class A, type III; and T300/F-155 unidirectional graphite epoxy prepreg per BMS 8-168. One build-up of material comprising the straps 38 and 40 which has been constructed included: 2 plies of 1581 cloth (±45°) at 0.009 inches; (1 ply of uni 'S' glass at 0.0085 inches, 3 plies of uni graphite at 0.0065 inches, 1 layer of 'X' ply (±45°) at 0.017 inches) repeated 18 times; 10 plies of uni 'S' glass at 0.0085 inches, and 2 plies of 1581 cloth (±45°) at 0.009 inches. This resulted in 104 plies and a total thickness of 0.931 inches. The filler blocks 56 are preferably fabricated of epoxy impregnated prepreg 'E' glass per BMS 8-79, class III, GR 1, type 1581, Form (1), and 45° bias plied epoxy prepreg per BMS 8-164, class A, type III.

In the pitch housing 14, the strap 80 is preferably fabricated of unidirectional preimpregnated fiberglass per BMS 8-164, class A, type I (250-S) and unidirectional cross ply preimpregnated fiberglass per BMS 8-164, class A, type II (250-S). The strap 82 is preferably fabricated of unidirectional preimpregnated fiberglass per BMS 8-164, class A, type I (250-S). The center stiffener 84 is preferably fabricated of unidirectional preimpregnated fiberglass per BMS 8-164, class A, type I (250-S), unidirectional cross ply preimpregnated fiberglass per BMS 8-164, class A, type II (250-S) and polyurethane foam closed cell-cured density to be 23–29 lb/ft$^3$. The D-section (support section) 78 is preferably fabricated of unidirectional preimpregnated fiberglass per BMS 8-164, class A, type I (250-S), unidirectional cross ply preimpregnated fiberglass per BMS 8-164, class A, type II (250-S) and woven fiberglass preimpregnated per 8-79, class III, group I, type 1581. The filler packs 104, 106, 108 and 110 are preferably fabricated of unidirectional preimpregnated fiberglass per BMS 8-164, class A, type I (250-S). The filler packs can be given their desired shape by utilizing a mold having the given shape and laying-up the individual plies in the mold.

All final lay-ups (components or assemblies) are cured in accordance with a typical cure cycle which is defined to include a temperature of 250 degrees; a pressure range of 50–100 psi and a cure time of from 3.5 to 5 hours. Once cured, the components and assemblies are structuralized, i.e., capable of accepting external loads.

The rotor system described avoids the need for any type of lubrication system because of the use of elastomeric bearings. The use of composite materials results in a structurally redundant, lightweight and low aerodynamic drag rotor system.

We claim:

1. A pitch housing assembly for the rotor system of a helicopter, comprising:
   a composite pitch housing;
   a composite pitch shaft mounted at each end to an elastomeric bearing supported by the housing and capable of reacting both axial and radial loads; and
   a composite flap motion stop means mounted to the pitch shaft and supported by the housing.

2. The pitch housing assembly as defined in claim 1, wherein the composite pitch housing includes two composite closed loop straps, one of which forms a lug for attachment to the rotor hub of the rotor system, and both of which form a pair of lugs to which a rotor blade of the rotor system is attached.

3. The pitch housing assembly as defined in claim 2, wherein the composite pitch housing further includes a support section about which adjacent loops of one of said closed loop straps of said pitch housing extend.

4. The pitch housing assembly as defined in claim 3, wherein the support section comprises a opposite support section, said support section supporting one end of the pitch shaft and defining a bearing surface for engagement with one of the elastomeric bearings.

5. The pitch housing assembly as defined in claim 4, wherein the composite pitch housing further includes stiffener means situated between adjacent extensions of one of the closed loop straps of said pitch housing.

6. The pitch housing assembly as defined in claim 5, wherein said stiffener means comprises composite stiffener means.

* * * * *